United States Patent
Corfitsen (12)

(10) Patent No.: US 6,663,173 B1
(45) Date of Patent: Dec. 16, 2003

(54) ARRANGEMENT AT AIRPLANE SEATS

(75) Inventor: Sten Corfitsen, Lidingö (SE)

(73) Assignee: Mega Technology AB, Lidingo (SE)

( * ) Notice: Subject to any disclaimer, the term of this patent is extended or adjusted under 35 U.S.C. 154(b) by 0 days.

(21) Appl. No.: 09/890,861

(22) PCT Filed: Dec. 21, 1999

(86) PCT No.: PCT/SE99/02453

§ 371 (c)(1),
(2), (4) Date: Aug. 7, 2001

(87) PCT Pub. No.: WO00/38986

PCT Pub. Date: Jul. 6, 2000

(30) Foreign Application Priority Data

Dec. 29, 1998 (SE) ................................................ 9804590

(51) Int. Cl.⁷ ................................................ A47C 17/00
(52) U.S. Cl. ..................................... 297/62; 5/9.1; 5/16
(58) Field of Search ........................... 297/62, 118, 124, 297/234, 236, 257; 5/8, 9.1, 14, 16

(56) References Cited

U.S. PATENT DOCUMENTS

| 610,421 | A | * | 9/1898 | Turner ........................ 297/62 |
| 1,359,637 | A | * | 11/1920 | Travis et al. ................... 297/62 |
| 2,550,599 | A | * | 4/1951 | Reed ............................. 5/9.1 |
| 3,858,254 | A | | 1/1975 | Coomes |
| 4,051,564 | A | * | 10/1977 | Gudish .......................... 5/9.1 |
| 5,171,062 | A | * | 12/1992 | Courtois ................ 297/284.11 |
| 5,520,438 | A | * | 5/1996 | Stulik .................... 297/284.11 |
| 5,690,355 | A | * | 11/1997 | Kleinberg ................ 280/730.1 |

FOREIGN PATENT DOCUMENTS

| FR | 729925 | * | 8/1932 |
| WO | 95/32873 | | 12/1995 |

* cited by examiner

Primary Examiner—Peter R. Brown
(74) Attorney, Agent, or Firm—Young & Thompson

(57) ABSTRACT

An arrangement pertaining to aircraft seats (1) includes a seat cushion (2) and a backrest (3), with a number of aircraft seats (1A–D) juxtaposed. The seat cushions (2) of the juxtaposed aircraft seats (1A–D) can be raised or lowered to form a long, generally continuous bed surface, and a further bed section (9) which is normally located beneath the seat cushions or hoisted into the cabin ceiling structure can form a further bed section (9).

11 Claims, 2 Drawing Sheets

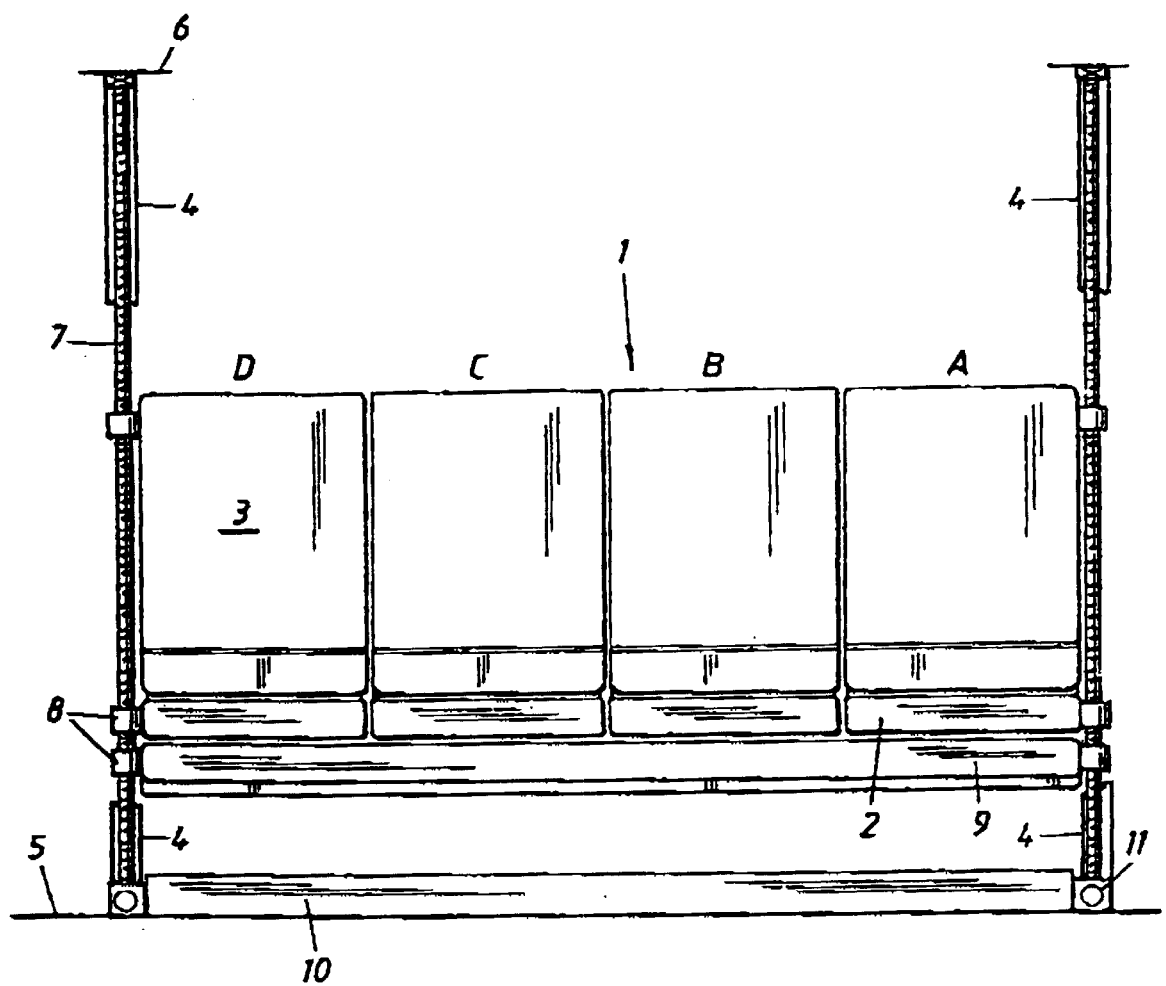

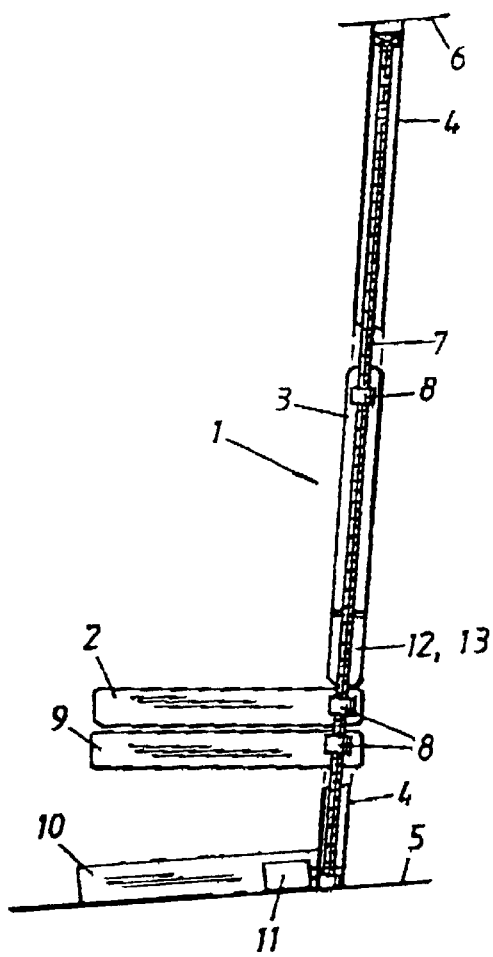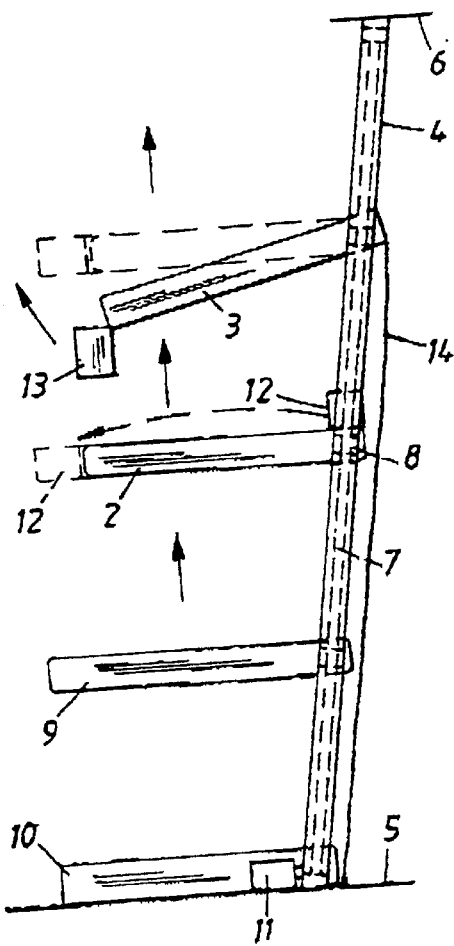

ARRANGEMENT AT AIRPLANE SEATS

BACKGROUND OF THE INVENTION

The present invention relates to an arrangement pertaining to aircraft seats.

A large number of flights of long duration are carried out daily throughout the world, i.e. flights involving flight times in excess of six hours. Although most passengers are able to sit comfortably in a seat during these flights, a large number feel the need to stretch out after about 3–4 hours, preferably in lying position and to fall asleep. However, this is not possible in the majority of cases, except for those companies that have provided spacious first-class facilities, The cost of a first-class ticket, however, is too high for many travellers, and consequently not all passengers that would like to avail themselves of the possibility of sleeping more easily on an aircraft do not have this possibility in practice. Neither do present-day aircraft have sufficient space to include such a facility for all passengers on board, since sleeping places require much more room than the typical seats in business class and economy class on aircraft.

SUMMARY OF THE INVENTION

Accordingly, an object of the present invention is to provide an arrangement which enables bed structures to be provided in the spaces allocated to present-day aircraft seats.

The object of the invention is achieved by exploiting the vertical space above the aircraft seat, and by constructing the seat so that it can be brought to an arrangement in which several passengers can lie one above the other.

According to the present invention, the seats in a row of mutually juxtaposed seats are constructed to enable adjacent seat parts to be raised or lowered to form a long and essentially continuous bed surface, so that an additional surface, which is normally located beneath the seat cushions or suspended from the ceiling, provides an additional bed surface.

According to one further embodiment of the invention, the backrests of the seats can be swung up and possibly also raised, so as to form together another bed surface.

With aircraft seats in accordance with the present invention disposed in the centre section, another arrangement relating to aircraft seats in accordance with another invention for which an application for patent was filed at the same time as the present application, can be used for seat rows along the outer edges of the aircraft cabin, i.e. the window seats, although the invention can also be applied in respect of the rows at the windows provided that some displacement can be achieved in conjunction with raising or lowering the seat parts. The invention thus provides proper sleeping places for the majority of passengers, not only in first-class accommodation but also in business class and economy class accommodations.

BRIEF DESCRIPTION OF THE DRAWINGS

The present invention will now be described with reference to a non-limiting embodiment thereof illustrated in the accompanying drawings, in which FIG. 1 is a schematic front view of a center section of an aircraft body with four aircraft seats extending across the width of the aircraft, and also shows an arrangement according to the present invention;

FIG. 2 is a schematic side view of the seats shown in FIG. 1; and

FIG. 3 is a view corresponding to the view of FIG. 2 but showing the seats arranged to form a number of bed surfaces.

DESCRIPTION OF THE PREFERRED EMBODIMENTS

The aircraft seats shown in FIG. 1 are disposed in a seat row, suitably in the centre section of a so called wide-body aircraft. The seats 1 typically include a seat cushion 2 and a backrest 3. In the illustrated case, the seat row consists of four seats 1A, B, C and D. The two outer seats 1A and 1D are carried on rails 4 that extend between the floor 5 and the ceiling 6 of the cabin. Corresponding rails may also be mounted between each individual seat, i.e. a total of five rails for a section of four seats.

The rails 4 conveniently include rotatable rods 7 which include trapezoidal threads on which sleeves 8 having a corresponding internal thread run. These sleeves 8, or nuts, are attached to both the seat cushion 2 and the backrest 3, wherewith the seat cushion Z and the backrest 3 can both be caused to move up and down along the rails 4, by appropriate rotation of the threaded rods 7. In order to adjust the row of seats 1 from a seat mode, to a bed mode, the backrests of respective seats in said row are coupled together at their upper edges, where they are normally each collapsible and connected with the threaded rods 7 of the rails 4. The backrests 3 are then loosened at their lower edges and swung up along a pivot axle formed by the connection with said rods, into a generally horizontal position in which the rods 7 are caused to rotate so as to move the now horizontal backrest section 3 upwards to a suitable vertical height above the floor or to a suitable level beneath the ceiling.

Because the seat cushion section 2 of the seat is connected to the rods 7 via the threaded sleeves or nuts 8, the seat cushion will be raised to an extent that corresponds to the extent to which the rods 7 are rotated in order to move the backrest 3. This enables the seat cushion to be raised vertically to a position in which it is appropriately spaced beneath the backrest section 3, FIG. 3 shows a state in which both the backrest 3 and the seat cushion 2 have been raised to approximately their highest positions.

As will be seen from the drawings, there is provided beneath the seat cushion 2 a bed section 9 which extends across the full width of the seat section 1A–D and which is also conveniently connected to the threaded rods 7 of said rails by means of sleeves or nuts 8, so as to enable also the bed section 9 to be raised slightly in conjunction with rotating the rods 7 when moving the backrest 3 and the seat cushion 2. As will be evident from FIG. 3, the bed section 9 need not be raised to any great extent, whereas movement of the two other seat parts 2, 3 is considerably greater. This variation in distance through which the bed section 9 and the other seat parts 2, 3 are moved can be achieved for instance by giving the threaded rod a smaller pitch at the location where said bed section is connected to said rod, or by omitting a screw thread at this location, such as to restrict the extent to which the bed section 9 can be raised.

As shown in the drawings, a further bed surface 10 may be provided immediately against the floor and the height position for this further bed surface need therefore not be changed. With this further bed surface 10, the arrangement enables four superposed beds to be provided, i.e. the same number of beds as the number of seat places in the seat row.

As before mentioned, the seat parts that are to form the bed surfaces are raised and lowered by means of the rotatable rods 7. Rotation of the rods can be achieved with motors 11, suitably electric motors, mounted adjacent the rails and the rods either on the floor 5 or on the ceiling 6.

At least the bed surface formed by the backrest 3 will probably require some additional support and to this end an extendible support may be provided in the edge of said backrests for connection with the rails 4 when extended, A corresponding support may be provided in the seat cushion 2, and possibly also in the bed section 9.

The seat cushion 2 will typically slope rearwardly to some slight extent. Since a bed surface that slopes in this way is normally undesirable, some form of means may be provided that, when the seat cushion 2 is being moved from the normal seating position, somewhat rotates the bracket/-s which support the seat cushion, so that the bed surface formed by the seat cushion will be fully horizontal.

The width of the bed surface of the two upper beds, i.e. those formed by the seat cushion,Z and the back rest 3, can be extended by providing said seat cushion and said back rest with a respective extendible outer part 12 and 13. The height of the backrest will normally be sufficient to provide a broad upper bed surface, but for practical reasons, primarily to enable a passenger to have sufficient space to climb onto the bed, the extendible part of the backrest may not be too wide. The extendible outer part 12 of the upper bed may therefore be a part which is normally comprised of a part of the backrest but which can be dropped and raised to enable the passenger to get into bed more easily, said extendible outer part 12 being then swung up into register with the backrest 2 once the passenger has positioned himself/herself on the bed. The same applies to the outer part 13 of the seat cushion 3 although this outer part 13, similar to the other outer part 12, will normally comprise a bottom part of the backrest but which remains in its original position at the rear edge of the seat cushion when the backrest has been raised and which can then be dropped or moved so as to form an outer part 13 of the second bed surface from above, which is thus formed essentially by the seat cushion.

The bed section 9 and the further bed surface 10 may optionally also include corresponding outwardly foldable parts so as to increase the width of the bed surfaces, although this is not so essential for surfaces that are located close to the floor, for comfort and safety reasons.

In order to provide some form of partition against the rearwardly lying row of seats, a curtain 14 can be arranged in the rear edge of the rails 4. This curtain may comprise a roller blind that can be pulled down from the ceiling, or a curtain that is incorporated in the rear edge of one or more of the cushions forming the different bed surfaces. A corresponding arrangement may also be provided at the short ends of the bed surfaces so as to provide aisle partitions. A corresponding curtain may also be provided at the long front edge of the beds, so as to provide a fully delimited sleeping space.

Although the drawings illustrate an example of the invention where the number of seats that are converted into beds and the number of beds thus provided are four in number, it will be understood that the invention can also be applied with a fewer number of aircraft seats, provided that bed surfaces of sufficient width can be obtained For instance, a centre section in a so called wide-body aircraft may include four mutually juxtaposed seats in the economy class, but only three such seats in the business class and it will be understood that since these three seats will normally be slightly wider, it is possible to rearrange the seats into three mutually superposed beds in a manner corresponding to that described with reference to the four beds. The limited head room in an aircraft will probably prevent the arrangement of more than four beds.

The inventive arrangement thus provides a facility that enable travellers seated in a centre row section for instance to stretch out in a lying position without passengers in other rows being affected by the rearrangement of the seats in one row into beds.

As previously mentioned, the further bed section 9 shown located beneath the seat cushion section 2 may alternatively be accommodated in the cabin ceiling structure with the aid of hoist means that enable said section to be lowered along the rails to form a bed surface. In this case, this bed section will conveniently form the uppermost bed surface and the backrest sections may form the next highest bed surface. This embodiment may also be supplemented with a further bed surface 10 in the vicinity of the cabin floor. The various bed sections may be raised and lowered in a manner corresponding to that described with reference to the illustrated embodiment.

The arrangement may also include more bed sections, such as the bed section 9 described above, which are stored on top of each other, either beneath the seat cushion 2 or hoisted in the cabin ceiling structure, such as to enable said bed sections to be raised or lowered to form bed surfaces.

What is claimed is:

1. An arrangement of plural aircraft seats, comprising:

plural juxtaposed seat sections;

plural juxtaposed backrest sections that are each associated with a respective one of said seat sections;

plural rails that are arranged and adapted to extend from a floor on which the aircraft seats are arranged to an overhead above the aircraft seats; and plural fittings that are each infinitely adjustable along at least part of a respective one of said rails and that connect said seat sections and said backrest sections to respective ones of said rails, wherein movement of said fittings along said rails allows said seat sections to form a first elongate and generally continuous bed surface and said backrest sections to form a second elongate and generally continuous bed surface.

2. The arrangement of claim 1, wherein said rails are rotatable threaded rods and said fittings are threaded so as to move when said rods are rotated.

3. The arrangement of claim 2, further comprising a motor operably connected to said threaded rods to cause rotation thereof.

4. The arrangement of claim 1, further comprising a third elongate and generally continuous bed surface that is one of above and below said seat sections and that is connected to respective ones of said rails by further ones of said plural fittings.

5. The arrangement of claim 1, wherein said seat sections and said backrest sections are connected to and are between only two of said rails.

6. The arrangement of claim 1, wherein two of said fittings on a same one of said rails are movable at different speeds along different parts of said one rail.

7. An arrangement of plural aircraft seats, comprising:

plural seat cushions and backrests;

plural rotatable threaded rods that are arranged and adapted to extend from a floor on which the aircraft seats are arranged to an overhead above the aircraft seats; and plural threaded fittings that are each movable along at least part of a respective one of said rods and that connect said seat cushions and backrests to respective ones of said rods, wherein movement of said fittings along said rods allows said seat cushions to form a first elongate bed surface and said backrests to form a second elongate bed surface.

8. The arrangement of claim 7, wherein said backrests are rotatable about respective ones of said fittings to be generally parallel to said seat cushions.

9. The arrangement of claim 7, further comprising a motor operably connected to said rods to cause rotation thereof.

10. The arrangement of claim 7, further comprising a third elongate bed surface that is one of above and below said seat cushions and that is connected to respective ones of said rods by further ones of said plural fittings.

11. The arrangement of claim 7, wherein two of said fittings on a same one of said rods move at different speeds along different parts of said one rod when said one rod rotates.

* * * * *